(12) United States Patent
Winiecki (10) Patent No.: US 9,008,947 B1
(45) Date of Patent: Apr. 14, 2015

(54) METHOD OF CALCULATING AVERAGE REVOLUTIONS PER INDEPENDENT UNIT

(71) Applicant: Kenneth Carl Steffen Winiecki, Cupertino, CA (US)

(72) Inventor: Kenneth Carl Steffen Winiecki, Cupertino, CA (US)

( * ) Notice: Subject to any disclaimer, the term of this patent is extended or adjusted under 35 U.S.C. 154(b) by 0 days.

(21) Appl. No.: 14/507,221

(22) Filed: Oct. 6, 2014

Related U.S. Application Data (60) Provisional application No. 61/951,381, filed on Mar. 11, 2014.

(51) Int. Cl.
G01M 15/04 (2006.01)
(52) U.S. Cl.
CPC ............ G01M 15/046 (2013.01); G01M 15/04 (2013.01)
(58) Field of Classification Search
CPC ........................... G01M 15/046; G01M 15/04
USPC ............ 701/102, 29.1, 29.4, 29.9, 30.9, 30.1, 701/31.9, 32.5, 33.4; 73/114.25, 114.01
See application file for complete search history.

(56) References Cited

U.S. PATENT DOCUMENTS

| | | | | |
|---|---|---|---|---|
| 4,931,940 A | * | 6/1990 | Ogawa et al. ................. | 701/101 |
| 5,560,336 A | * | 10/1996 | Takahashi et al. ....... | 123/406.24 |
| 2013/0291629 A1 | * | 11/2013 | Falzarano ................. | 73/114.01 |

* cited by examiner

*Primary Examiner* — Mahmoud Gimie (57) ABSTRACT

A method to obtain average revolutions per independent unit includes a total number of engine revolutions with the engine control unit (ECU) and a current odometer value with the ECU so that a final value can be calculated by dividing the total number of engine revolutions with the current odometer value for a designated time period. The current odometer value can be a distance unit or time unit as the final value, which is the average revolutions per independent unit, is displayed with a control panel of a vehicle. The final value provides an accurate conclusion regarding the current condition of an engine in addition to the mileage of the engine or the engine hours.

5 Claims, 7 Drawing Sheets

METHOD OF CALCULATING AVERAGE REVOLUTIONS PER INDEPENDENT UNIT

The current application claims a priority to the U.S. Provisional Patent application Ser. No. 61/951,381 filed on Mar. 11, 2014.

FIELD OF THE INVENTION

The present invention relates generally to the field of vehicles. More specifically, the present invention is a method that divides the total number of revolutions on an engine by an independent unit so that an accurate reading can be obtained regarding the condition of the engine in relation to a distance unit or a time unit.

BACKGROUND OF THE INVENTION

Used vehicles are valued via several variables including, but not limited to, the interior condition, exterior condition, model, production year, and mileage. Even though different variables are utilized to calculate the monetary value of used vehicles, the mileage of used vehicles is considered to the most important aspect during the pricing process as the mileage is directly related to the mechanical condition of the engine. However, the relationship between the mileage and the condition of the engine can be misleading in some instances. For example, some older high mileage cars may have engines that have been well maintained and revved with low engine revolutions while some older low mileage cars may have engines that have been abused and revved with high engine revolutions. Normally a buyer would purchase the low mileage car assuming it has the better engine compared to the high mileage car. In relation to the example, the low mileage car has the worse conditioned engine compared to the engine of the high mileage car. This provides a real challenge for used car buyers because they cannot find out the how the engine of a particular used car is cared for by the previous owner.

It is an object of the present invention to introduce a method to obtain average revolutions per independent unit so that the buyer can value the used vehicle from both the mileage and the average revolutions per independent unit. The present invention takes into consideration the number of total revolutions of the engine and the total distance traveled by the vehicle or the total runtime of the engine so that the average revolutions per independent unit can be calculated. Resulting data of the present invention can be displayed within the control panel of the vehicle as the resulting data provides valuable information not only for buyers but also for car dealers, car rental places, insurance companies, and many other similar vehicle related entities.

DETAIL DESCRIPTIONS OF THE INVENTION

All illustrations of the drawings are for the purpose of describing selected versions of the present invention and are not intended to limit the scope of the present invention.

Figure 1:
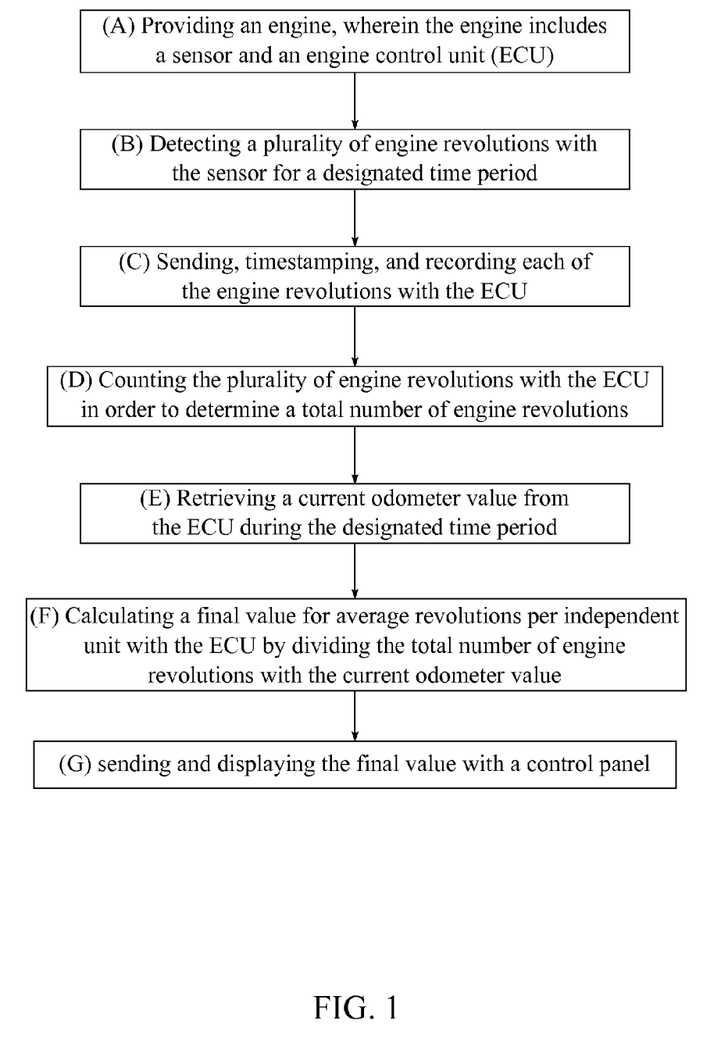
FIG. 1 is a basic flow chart illustrating the overall method of the present invention.

In reference to FIG. 1, the present invention is a method of calculating average revolutions per independent unit in a vehicle. The numerical value of the average revolutions per independent unit is displayed through a control panel of a vehicle as the independent unit of the present invention can be either a distance unit or a time unit. The present invention provides an additional variable regarding the condition of an engine of the vehicle so that the users of the present invention are able to determine the condition of the engine in relation to the driving styles of the previous users. Knowing how the engine is revved by the previous users provides an accurate conclusion about the engine in addition to the mileage of the engine or the engine hours. In order for the present invention to function, the engine is required to electronically connect with a sensor and an engine control unit (ECU).

The sensor detects a plurality of engine revolutions of the engine for a designated time period, wherein the designated time period can be lifetime of the engine and a trip time. Since the ECU and the sensor are electronically connected with each other, the sensor is able send the plurality of engine revolutions to the ECU, wherein the sensor of the present invention can be either a crankshaft sensor or a camshaft speed sensor. Once the ECU receives the plurality of engine revolutions, the ECU timestamps and records each of the plurality of engine revolutions. In other words, each timestamp within the ECU represents a single engine revolution of the plurality of engine revolutions so that the ECU is able to determine the duration of each engine revolutions, exact date of each engine revolutions, and exact time of each engine revolutions. Then the ECU counts the plurality of engine revolutions in order to determine a total number of engine revolutions for the present invention. More specifically, the total number of engine revolutions is considered to be zero for an engine that has not been fired for the first time. However, once an engine has been fired, each of the plurality of engine revolutions is counted and added into the total number of engine revolutions. Every time the engine completes the single engine revolution, the respective single engine revolution is added into the total number of engine revolutions. As a result, the total number of engine revolutions always increases within the present invention.

The ECU also retrieves a current odometer value, which normally displays through an odometer of the control panel, during the designated time period in order to calculate the average revolutions per independent unit. Then the ECU calculates a final value for the average revolutions per independent unit by dividing the total number of engine revolutions with the current odometer value. Then the final value is sent and displayed with the control panel.

Figure 4:
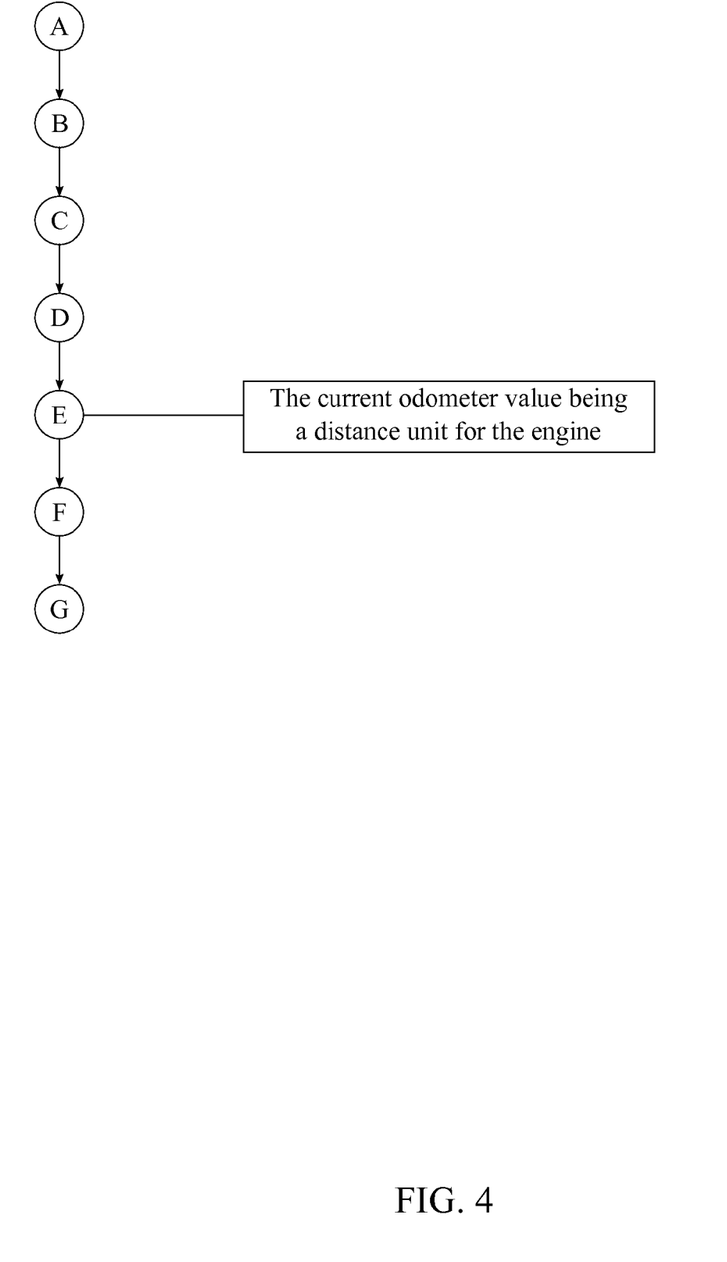
FIG. 4 is a basic flow chart illustrating the overall method of the present invention, wherein the current odometer value is a distance unit.

In reference to FIG. 1 and FIG. 4, when the current odometer value of the vehicle is the distance unit, the current odometer value illustrates the total distance that the vehicle has been traveled up into that instant. Then the ECU calculates the final value for the average revolutions per distance unit by dividing the total number of engine revolutions with the current odometer value. Then the final value is sent and displayed with the control panel. The final value that is obtained through the present invention and the current odometer value, which is the total distance that the vehicle has been traveled, provide an accurate conclusion about the condition of the engine with respect to the distance unit.

Figure 5:
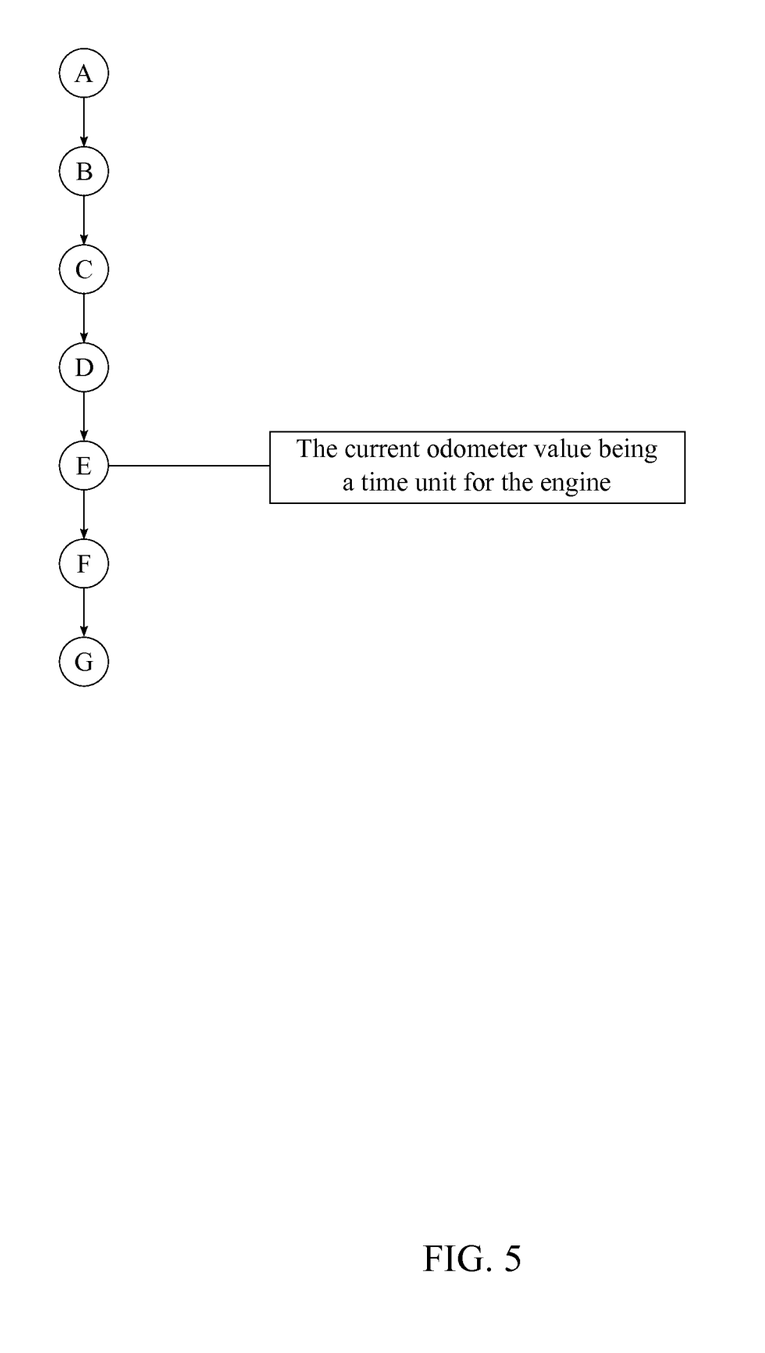
FIG. 5 is a basic flow chart illustrating the overall method of the present invention, wherein the current odometer value is a time unit.

In reference to FIG. 1 and FIG. 5, when the current odometer value of the vehicle is the time unit, the current odometer value illustrates the total time that the vehicle has been operated up into that instant. Then the ECU calculates the final value for the average revolutions per time unit by dividing the total number of engine revolutions with the current odometer value. Then the final value is sent and displayed with the control panel. The final value that is obtained through the present invention and the current odometer value, which is the total time that the vehicle has been operated, provide an accurate conclusion about the condition of the engine with respect to the time unit.

Following is an example how the present invention can be implemented to determine the condition of a used car engine with respect to the distance unit.

Displaying only the Mileage:
    A buyer is looking at two similar used cars, car A and car B, wherein both used cars having the exact mileage of 2500 miles.
    Car A is $1000 cheaper than the car B.
    The buyer purchases car A since car A has the lower selling price compare to car B.

Displaying the Mileage and the Final Value:
    A buyer is looking at two similar used cars, car A and car B, wherein both used cars having the exact mileage of 2500 miles.
    Car A is $1000 cheaper than the car B.
    Car A displays a final value of 3850 and 9,625,000 of engine revolutions for the lifetime of the engine while car B displays a final value of 1900 and 4,750,000 of engine revolutions for the lifetime of the engine.
    The buyer purchases car B since car B has the lower final value compare to car A.

Conclusion:
    In the event of the buyer purchasing car A, the buyer initially saves $1000. But the buyer will be fixing or replacing the engine of car A in the near future, spending more than $1000 in repair cost.
    In the event of the buyer purchasing car B, the buyer initially spends additional $1000. But the buyer will have a dependable car without any additional repair cost.

Figure 2:
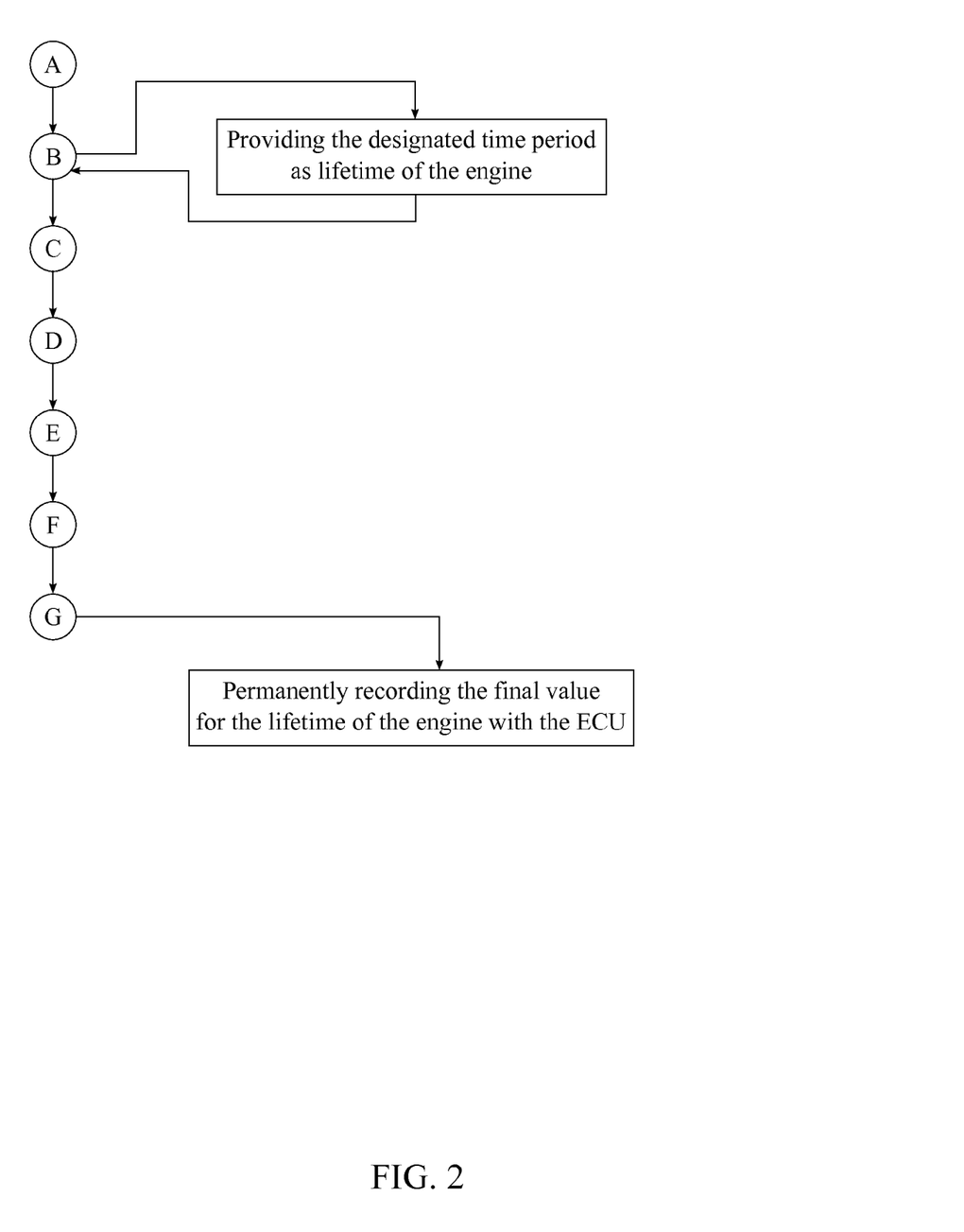
FIG. 2 is a basic flow chart illustrating the overall method of the present invention in relation to the lifetime of the engine.
Figure 3:
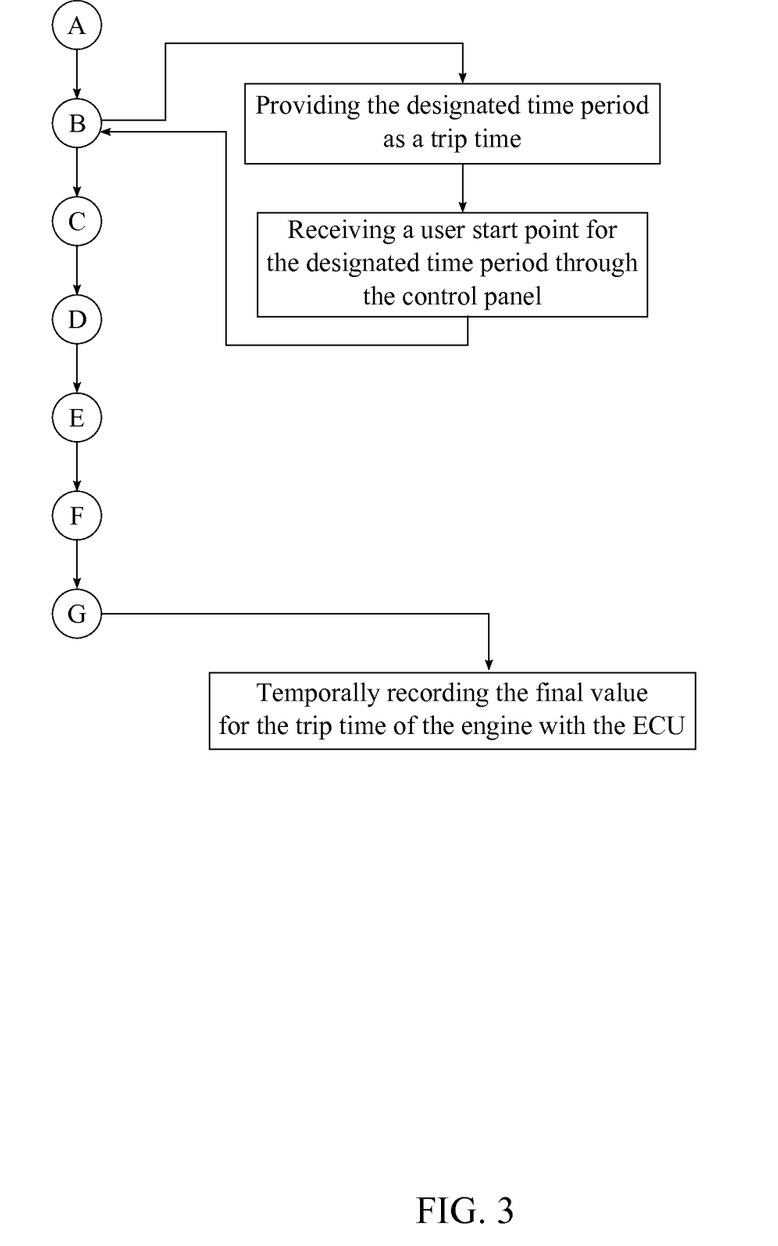
FIG. 3 is a basic flow chart illustrating the overall method of the present invention in relation to the trip time of the engine.

In reference to FIG. 2 and FIG. 3, the ECU displays the final value with the control panel in regards to the two different designated time periods, which are the lifetime of the engine and the trip time. More specifically, the user of the vehicle can view the final value for both the lifetime of the engine and the trip time after viewing the total number of engine revolution and the current odometer value respectively. When the designated time period is the lifetime of the engine, the ECU calculates and displays the final value for the engine from a first engine revolution of the total number of engine revolutions to a final engine revolution of the total number of engine revolutions. Then the final value for the lifetime of the engine is permanently recorded with the ECU. When the designated time period is the trip time, the ECU calculates and displays the final value for the engine from a user start point of the total number of engine revolutions to the final engine revolution of the total number of engine revolutions. The user of the vehicle generally inputs the user start point through the control panel so that the final value can be calculated for the trip time with the ECU. If the user of the vehicle does not input the user start point through the control panel, the ECU automatically assigns the first engine revolution as the user start point. Additionally, the final value for the trip time is temporally recorded with the ECU so that the most recent final value for the trip time can be viewed to the users of the present invention. However, every instant that the trip time is reset by the user of the vehicle, the final value for the respective trip time is stored within the ECU so that the present invention is able to record how many times that the trip time is activated.

Figure 6:
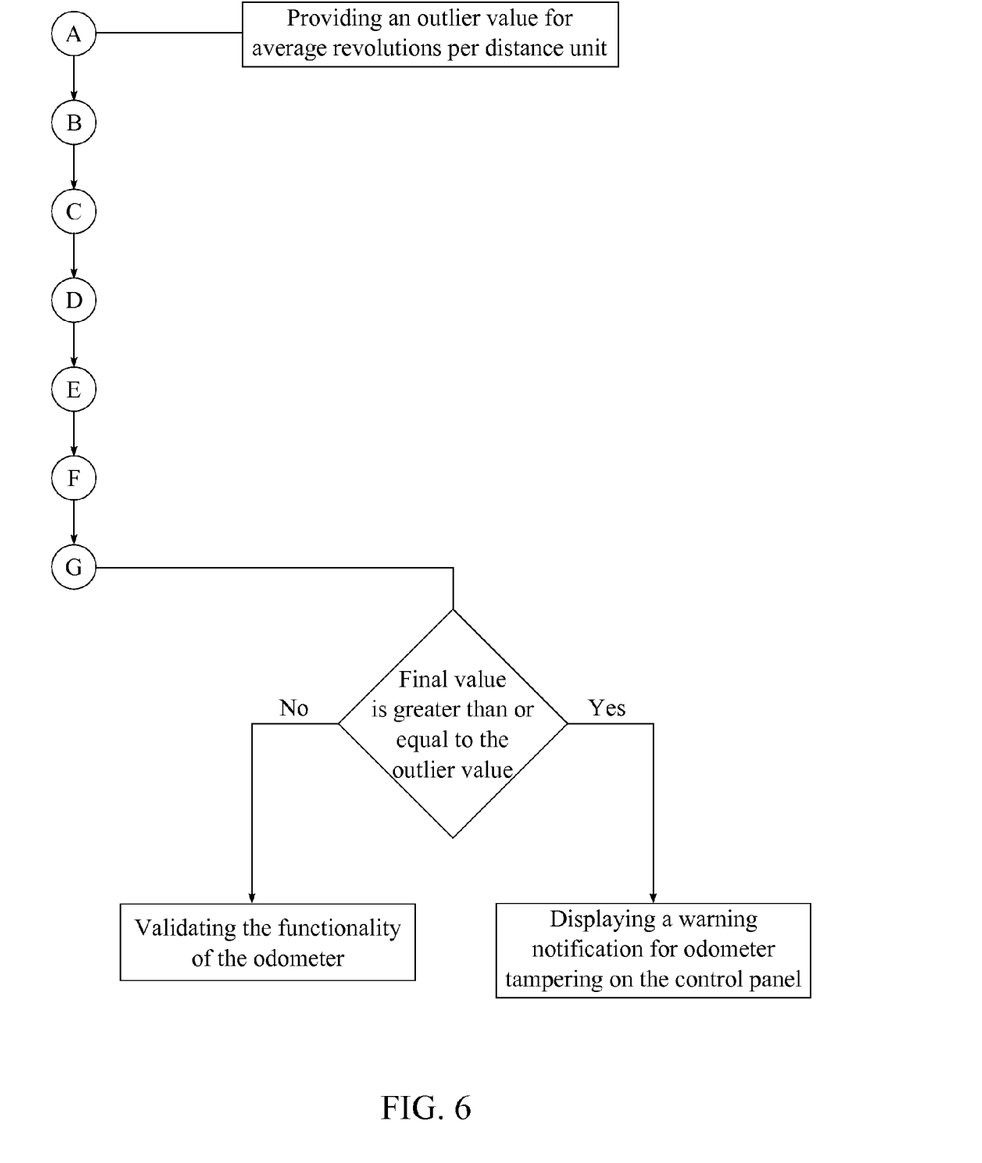
FIG. 6 is a basic flow chart illustrating how the warning notification generated within the overall method of the present invention.

In reference to FIG. 6, an outlier value of the present invention is stored within the ECU, wherein the outlier value is slightly higher than the maximum possible final value of the present invention. The outlier value functions as a threshold value to detect any odometer tampering of the vehicle. More specifically, when the final value of the present invention is greater than or equal to the outlier value for a predetermined time period, the ECU determines that the odometer of the vehicle is compromised. The predetermined time period is defined within the ECU so that the ECU is easily able to retrieve the predetermined time period for the calculation of the final value. Then a warning notification for the odometer tampering is displayed on the control panel, wherein the warning notification only provides a visual notification to the user of the vehicle. For example, if the present invention detects that the plurality of engine revolutions has occurred and the current odometer value has not been changed in relation to the outlier value for the predetermined time period, the warning notification is displayed with the control panel. The ECU applies the same process in order to validate the functionality of the odometer through the present invention. More specifically, when the final value of the present invention is less than the outlier value, the ECU validates the proper functionality of the odometer. Once the warning notification is displayed through the control panel, the ECU records the warning notification in order to keep track of the total number of displayed warning notifications within the present invention. For example, if an engine has displayed twenty warning notifications, the present invention records twenty different recording for each of the warning notification within the ECU.

Figure 7:
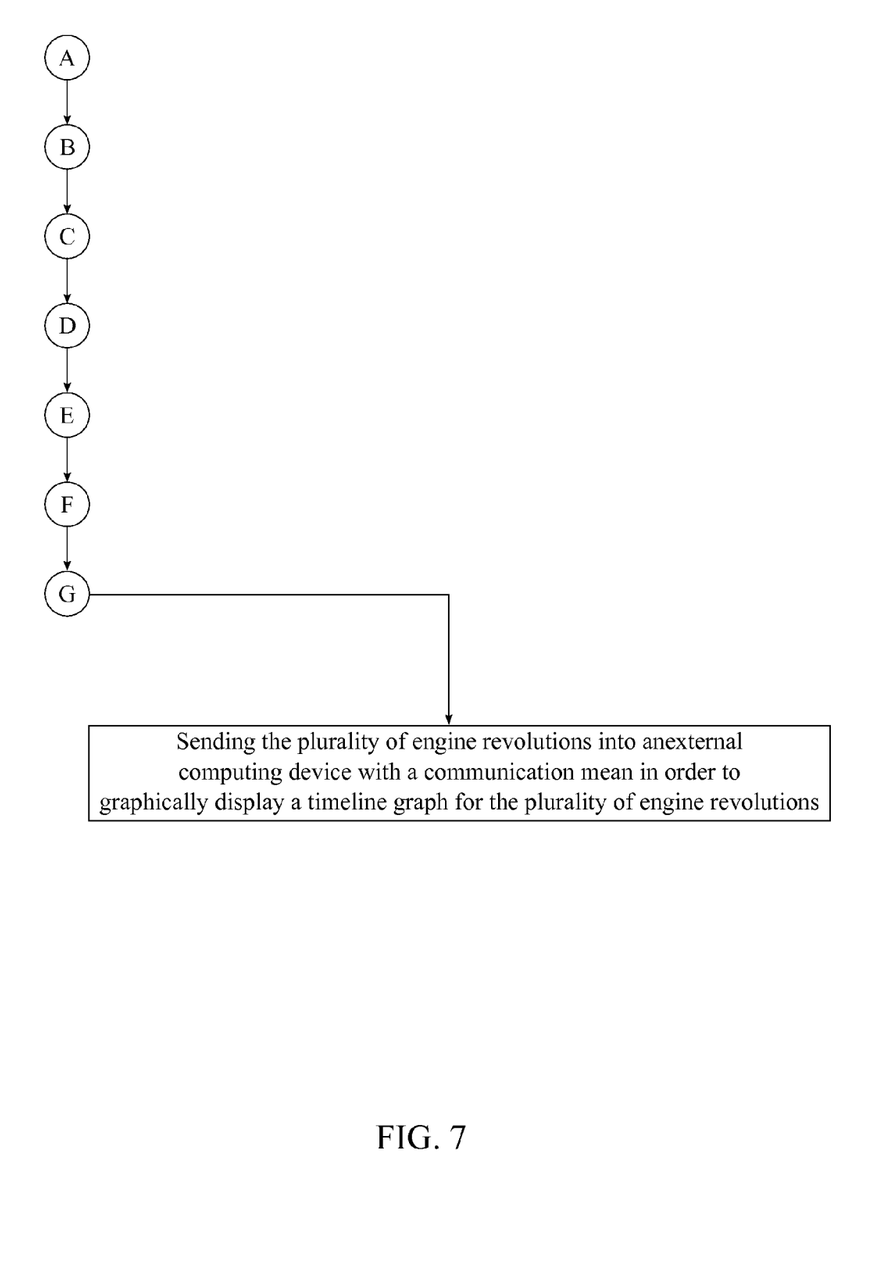
FIG. 7 is a basic flow chart illustrating how the timeline graph is created in relation to the present invention.

In reference to FIG. 7, the ECU also sends the plurality of engine revolutions into an external computing device with a communication mean including, but is not limited to, an on-board diagnostic (OBD) connector, a universal serial bus (USB), a local area wireless technology, cellular network, and a wireless technology standard for exchanging data over short distances. More specifically, the plurality of engine revolutions can be exported into the computing device so that the plurality of engine revolutions can be graphically displayed on a timeline graph. As a result, the vehicle owners or the respective users are able to access the data regarding how the engine is revved by the driver of the vehicle. These data can be utilized by car manufactures, car leasing companies, insurance companies, motor vehicle departments, rental agencies, used car buyer, and any other related consumers to properly diagnose the condition of the engine and the driving style of the divers.

Although the invention has been explained in relation to its preferred embodiment, it is to be understood that many other possible modifications and variations can be made without departing from the spirit and scope of the invention as hereinafter claimed.

What is claimed is:

1. A method of calculating average revolutions per independent unit in a vehicle comprises the steps of:
- (A) providing an engine, wherein the engine includes a sensor and an engine control unit (ECU);
- (B) detecting a plurality of engine revolutions with the sensor for a designated time period;
- (C) sending, timestamping, and recording each of the engine revolutions with the ECU;
- (D) counting the plurality of engine revolutions with the ECU in order to determine a total number of engine revolutions;
- (E) retrieving a current odometer value from the ECU during the designated time period;
- (F) calculating a final value for average revolutions per independent unit with the ECU by dividing the total number of engine revolutions with the current odometer value;
- (G) sending and displaying the final value with a control panel of a vehicle;

providing an outlier value for average revolutions per independent unit;

displaying a warning notification for odometer tampering on the control panel, if the final value is greater than or equal to the outlier value for a predetermined time period; and sending the plurality of engine revolutions into an external computing device with a communication mean in order to graphically display a timeline graph for the plurality of engine revolutions.

2. The method of calculating average revolutions per independent unit in a vehicle as claimed in claim 1 comprises the steps of:

providing the designated time period as lifetime of the engine; and permanently recording the final value for the lifetime of the engine with the ECU.

3. The method of calculating average revolutions per independent unit in a vehicle as claimed in claim 1 comprises the steps of:

providing the designated time period as a trip time;

receiving a user start point for the designated time period through the control panel; and temporally recording the final value for the trip time with the ECU.

4. The method of calculating average revolutions per independent unit in a vehicle as claimed in claim 1 comprises, wherein the current odometer value being a distance unit for the engine.

5. The method of calculating average revolutions per independent unit in a vehicle as claimed in claim 1 comprises, wherein the current odometer value being a time unit for the engine.

* * * * *